United States Patent
Zhang et al.

(10) Patent No.: US 11,928,491 B1
(45) Date of Patent: Mar. 12, 2024

(54) MODEL-DRIVEN SERVER MIGRATION WORKFLOWS

(71) Applicant: Amazon Technologies, Inc., Seattle, WA (US)

(72) Inventors: Jiangtao Zhang, Pleasanton, CA (US); Wenjing Cao, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 534 days.

(21) Appl. No.: 17/102,154

(22) Filed: Nov. 23, 2020

(51) Int. Cl.
*G06F 9/455* (2018.01)
*G06F 8/61* (2018.01)
*G06F 9/4401* (2018.01)
*G06F 9/50* (2006.01)

(52) U.S. Cl.
CPC ........... *G06F 9/45558* (2013.01); *G06F 8/63* (2013.01); *G06F 9/4411* (2013.01); *G06F 9/5088* (2013.01); *G06F 2009/45562* (2013.01); *G06F 2009/4557* (2013.01)

(58) Field of Classification Search
CPC ............... G06F 9/4411; G06F 9/5088; G06F 2009/45562; G06F 2009/4557
See application file for complete search history.

(56) References Cited

U.S. PATENT DOCUMENTS

| | | | |
|---|---|---|---|
| 9,361,145 B1 * | 6/2016 | Wilson | G06F 13/28 |
| 9,778,952 B1 * | 10/2017 | Sutton | G06F 9/541 |
| 10,185,727 B1 * | 1/2019 | Wilton | G06F 16/214 |
| 10,754,741 B1 * | 8/2020 | Sethuramalingam | G06F 9/4856 |
| 2015/0370659 A1 * | 12/2015 | Pershin | G06F 11/203 714/4.11 |
| 2016/0105321 A1 * | 4/2016 | Thakkar | H04L 41/0883 709/220 |
| 2017/0199770 A1 * | 7/2017 | Peteva | G06F 9/5088 |
| 2019/0340003 A1 * | 11/2019 | Ramanathan | G06F 9/5077 |
| 2020/0026625 A1 * | 1/2020 | Konka | G06F 11/2028 |
| 2020/0192975 A1 * | 6/2020 | Maes | H04L 67/10 |
| 2021/0240378 A1 * | 8/2021 | Gurindapalli | G06F 3/0614 |
| 2021/0349767 A1 * | 11/2021 | Asayag | G06F 9/4856 |

(Continued)

OTHER PUBLICATIONS

Examiner search result on "linux kernel drivers list", search performed dated Mar. 11, 2023 (Year: 2023).*

(Continued)

*Primary Examiner* — Lewis A Bullock, Jr.
*Assistant Examiner* — Kevin X Lu
(74) *Attorney, Agent, or Firm* — Nicholson De Vos Webster & Elliott LLP

(57) ABSTRACT

Techniques are described for enabling model-driven server migration workflows in a cloud provider network. Cloud provider networks often provide various types of tools and services that enable users to migrate computing resources (e.g., servers, databases, applications, etc.) from users' on-premises computing environments to a cloud provider network. A model-driven server migration service as described herein comprises a plurality of modular migration components including, e.g., a snapshot validation component, a snapshot conversion component, an injection component, etc. The model-driven server migration service enables users to customize server migration workflows using server migration templates containing descriptive configurations for some or all of the provided migration components.

20 Claims, 8 Drawing Sheets

(56) References Cited

U.S. PATENT DOCUMENTS

| | | | |
|---|---|---|---|
| 2021/0377363 A1* | 12/2021 | Garaga | H04L 41/085 |
| 2021/0390170 A1* | 12/2021 | Olden | G06F 21/604 |
| 2022/0006805 A1* | 1/2022 | Kulkarni | H04L 67/10 |
| 2022/0109722 A1* | 4/2022 | You | G06F 9/5072 |
| 2022/0121480 A1* | 4/2022 | Chivukula | G06F 9/48 |

OTHER PUBLICATIONS

Examiner search result on "MacOS default drivers", search performed dated Mar. 11, 2023 (Year: 2023).*

Krazit, T., "Why the looming end of-support deadline for Windows Server 2008 is an enormous cloud migration opportunity," GeekWire, May 30, 2019, retrieved from Internet: https://www.geekwire.com/2019/looming-end-support-deadline-windows-server-2008-everyone-excited-huge-cloud-migration-opportunity/, 9 pages.

Taylor, C., "RTO vs RPO: Definitions, Examples & Difference Explained," Enterprise Storage Forum, last updated Jan. 2023, retrieved from Internet: https://www.enterprisestorageforum.com/management/rpo-and-rto-understanding-the-differences/, 7 pages.

* cited by examiner

MODEL-DRIVEN SERVER MIGRATION WORKFLOWS

BACKGROUND

Software modernization techniques are widely used by business organizations and other entities desiring to improve their information technology (IT) environments in response to changing software application use cases, resource demands, and user access patterns. For example, while many legacy applications were designed for older operating environments with lesser resources and expectations, modern applications now often need the ability to scale quickly to potentially millions of users, have global availability, manage very large amounts of data, and respond to requests in milliseconds. The various processes for upgrading, converting, and rewriting such applications to enable improved performance is referred to generally as "software modernization." Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
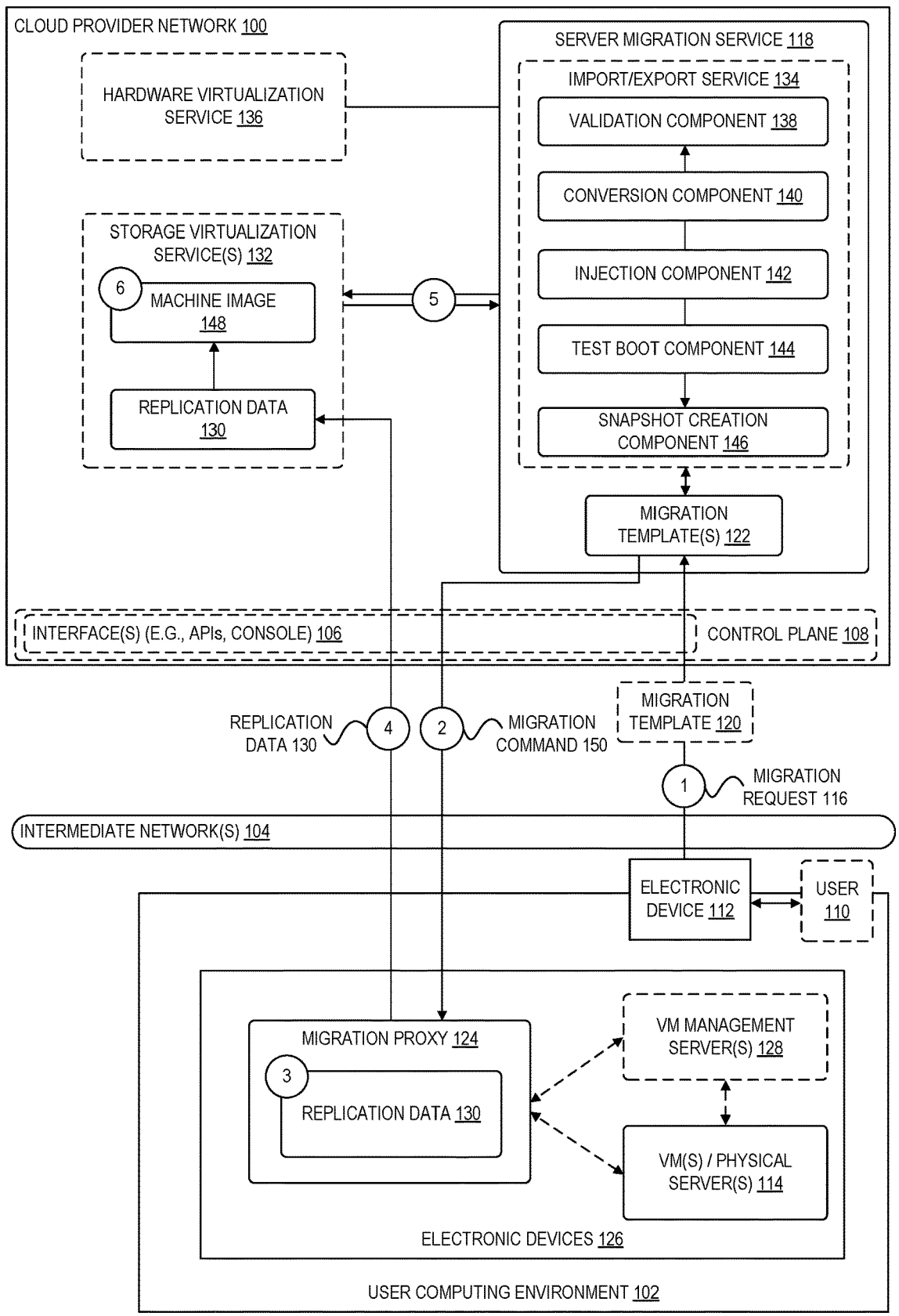
FIG. 1 is a diagram illustrating an environment for enabling model-driven server migration workflows in a cloud provider network according to some embodiments.

The present disclosure relates to methods, apparatus, systems, and non-transitory computer-readable storage media for enabling model-driven server migration workflows in a cloud provider network. Cloud provider networks often provide various types of tools and services that enable users to migrate computing resources (e.g., servers, databases, applications, etc.) from users' on-premises computing environments to a cloud provider network. According to embodiments described herein, a cloud provider network further provides a model-driven server migration service comprising a plurality of modular migration components including, e.g., a snapshot validation component, a snapshot conversion component, an injection component, and the like. In some embodiments, the model-driven server migration service enables users to customize server migration workflows using server migration templates containing descriptive configurations for some or all of the provided migration components. Among other benefits, by providing users with greater control over server migration processes, computing resources can be more efficiently migrated to a cloud provider network and thus able to realize the performance, resiliency, and scalability benefits provided by cloud provider networks.

As indicated, cloud provider networks typically provide various types of migration services that facilitate the migration of on-premises servers, workloads, and other computing resources to a cloud provider network. For example, a cloud provider network might provide a server migration service for migrating virtual machines (VMs) and other types of servers to the cloud provider network, a database migration service for migrating on-premises databases to a cloud-based database service, an application migration service for migrating entire application stacks, and the like. Users may desire to migrate such workloads and computing resources to a cloud provider network in part because cloud provider services often ease many of the burdens organizations face in managing on-premises data centers, which tend to be expensive to maintain and often encounter scalability and resiliency issues.

In some embodiments, to use a server migration service of a cloud provider network, a user installs a migration proxy (e.g., a connector appliance such as a pre-configured virtual machine (VM) or other software tool) in the user's on-premises environment. Once installed, the migration proxy and server migration service automate many server migration processes for identified VMs including, for example, creating and uploading base snapshots of VMs, validating the snapshots, converting snapshots to block storage volumes, injecting drivers into created volumes and modifying various configurations, generating modified snapshots, generating machine images based on snapshots, boot testing machine images, and copying machine images to user-accessible storage locations, among other possible processes. These automated migration process alleviate users from managing most of the tasks involved in migrating servers from an on-premises environment to a cloud provider network. However, in some cases, users may desire more control over the migration processes while still maintaining the benefits of an automated migration framework. For example, a user might desire to customize the behavior of a migration workflow to modify or omit certain processes (e.g., to skip test booting replicated servers, to modify a replication schedule and associated snapshot creation schedule, etc.), to enable the processes to handle new types of VMs or other type of computing resource (e.g., by modifying a set of drivers injected, to run custom user-generated scripts, etc.), and so forth.

According to embodiments described herein, model-driven server migration techniques and processes are described that provide users more control over server migrations process while preserving the benefits of an automated server migration service. In some embodiments, the model-driven server migration service described herein modularizes the server migration process and enables users to easily configure server migration processes using customizable server migration templates. In some embodiments, a server migration template describes a server migration workflow and can include one or more user-specified configurations related to the server migration components (e.g., to modify the behavior of one or more server migration components, to omit the performance of one or more components, etc.). Based on such templates, in some embodiments, a server migration service performs customized server migration workflows, thereby efficiently migrating resources to a cloud provider network in accordance with user-specified configurations.

FIG. 1 is a diagram illustrating an environment for enabling model-driven server migration workflows in a cloud provider network according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 may be part of, or serve as a front-end to, a control plane 108 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network 100 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

The hardware virtualization service 136 (referred to in various implementations as an elastic compute service, a virtual machines service, a computing cloud service, a compute engine, or a cloud compute service) can enable users of the provider network 100 to provision and manage compute resources such as virtual machine instances (e.g., based on machine images imported from users' computing environments 102. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As indicated, FIG. 1 illustrates an environment for enabling model-driven server migration workflows in a cloud provider network according to some embodiments. As shown, the environment includes the cloud provider network 100 and a user's on-premises computing environment 102. In this example, the circles numbered "1"-"6" in FIG. 1 illustrate an example process that includes a user 110 using an electronic device 112 to request the migration of one or more VMs or physical servers 114 from the user's computing environment 102 to the cloud provider network 100. According to embodiments described herein, the request (e.g., a migration request 116) is sent to a server migration service 118 and optionally identifies a server migration template 120. In some embodiments, the migration template 120 is one of a set of migration template(s) 122 provided by the server migration service 118 or a custom template created by a user of the cloud provider network 100. In some embodiments, responsive to such requests, the server migration service 118 automates the server migration process in coordination with a migration proxy 124 installed the user computing environment 102, as described in more detail hereinafter. Although the example illustrated in FIG. 1 is presented in the context of migrating a server in a user computing environment 102 to a cloud provider network 100, similar techniques can be used in other computing environments (e.g., migrating servers from one cloud provider network to another) or used to migrate other types of computing resources (e.g., databases, containers, etc.).

As indicated, FIG. 1 includes a user computing environment 102 with one or more servers (for example, VMs or physical servers 114) running on one or more electronic devices 126. VMs 114 are often implemented along with a virtual machine monitor (VMM) (not shown) that provides an execution environment for the VMs on a host electronic device. In many environments, VMs 114 are independently or collectively managed using one or more VM managements servers 128. For example, a VM management server 128 may be configured to manage a group of VMs, such as some or all the VMs executed within a data center. VM management servers 128 provide a centralized system for managing the lifecycle of its managed VMs including the ability to start and stop VMs, create complete or incremental snapshots (or backups) of VMs, restore VMs, modify permissions, functionalities, and configurations of VMs, and so forth.

To perform migrations of on-premises servers to a cloud provider network 100, in some embodiments, a customer can deploy and configure one or more migration proxies 124 in a user computing environment 102. A migration proxy 124, in some embodiments, is a software application (for example, a special purpose VM or a standalone application) that "connects" the server migration service 118 with the VMs 114 via one or more VM management servers 128 and that allows the server migration service 118 to indirectly perform migration-related operations upon the VMs 114. As one example, a migration proxy can include a FreeBSD VM in Open Virtualization Format (OVA) that can be downloaded from the cloud provider network 100. To deploy a migration proxy 124, a user can install or execute the migration proxy on an electronic device (for example, a server device) that has connectivity within a user computing environment 102 to reach one or more VM management servers 128 and the server migration service 118.

As indicated above, a migration proxy 124 acts as a local on-premises manager for certain operations of the migration process. For example, a migration proxy 124 may provide one or more of the following functionalities related to server migration processes: collection of replication data 130 (for example, disk snapshots) from servers 114 via VM management servers 128, and sending replication data to a cloud provider network 100 (e.g., for storage in a storage resource provided by a storage virtualization service 132). In some embodiments, a customer configures a migration proxy 124 with credentials used to communicate with one or more VM manager servers 128 (for example, a vCenter Server™ by VMWare® or a System Center Virtual Machine Manager (SCVMM) by Microsoft®) in the user network and also provides credentials used to authenticate with the cloud provider network 100. In an embodiment, a customer identifies which VMs 114 are desired for migration and the server migration service 118 can automatically assign migration operations to a migration proxy 124. In some embodiments, the server migration service 118 sends messages to a migration proxy 124 via a message service (for example, a message queueing service) or may "piggy-back" on health messages that the migration proxy 124 is configured to send.

In some embodiments, the server migration service 118 includes or uses an import/export service 134 to import VM images from users' existing environments to VM instances provisioned using the cloud provider network 100 (e.g., provisioned using a hardware virtualization service 136) and, if desired, to export such instances back to users' on-premises environment. In some embodiments, the import/export service 134 enables users to import a wide variety of VM types, including Windows® and Linux® VMs that use VMware ESX® or Workstation, Microsoft Hyper-V®, Citrix Xen® virtualization format, among other possible formats. As indicated, in some embodiments, to import a VM, a snapshot of the VM is created and uploaded to a storage resource (e.g., replication data 130 a storage bucket provided by a storage service 132 of the cloud provider network).

According to embodiments described herein, an import/export service 134 is implemented based on a plurality of interrelated server migration components such as, for example, a validation component 138, a conversion component 140, an injection component 142, a test boot component 144, and a snapshot generation component 146, among other possible components (e.g., a continuous replication component). In some embodiments, the import/export service 134 performs server migration workflows responsive to requests to migrate servers to the cloud provider network 100 and based on server migration templates identified in requests (e.g., based on migration template(s) 122, which can include default templates and templates created and provided by users). In some embodiments, the server migration service 118 enables the automation, scheduling, and tracking of server migrations and the incremental replication of servers using the functionality provided by the import/export service 134. Although not depicted, in some embodiments, the cloud provider network 100 further includes an application migration service that enables users to migrate entire application stacks (e.g., application stacks including web servers, database servers, application servers, etc.). In some embodiments, the components of the import/export service 134 are implemented using a microservice architecture, where each component is implemented by one or more microservices of the microservice architecture. In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples.

As indicated, in some embodiments, users can configure the operation of a server migration service 118 using server migration templates. In some embodiments, a server migration template is a file or other data resource that describes a desired server migration workflow including global configurations and configurations associated with one or more of the provided server migration components (e.g., components 138-146). For example, a server migration template may be a text file containing a JavaScript Object Notation (JSON), YAML Ain't Markup Language (YAML), Extensible Markup Language (XML), or other structured description of a migration workflow. In some embodiments, a server migration service 118 provides default templates (e.g., migration template(s) 122) describing common migration workflows and further enables users to provide customized templates describing custom migration workflows. The templates provided by the server migration service 118 can include, for example, templates that model processes for various different operating system types and versions (e.g., including particular driver injection and other processes customized for particular operating systems). In some embodiments, the selection of such operating system and version-specific templates can be performed automatically based on detection of an operating system type and version by the server migration service 118 or based on user select of a particular template. As another example, users can create server migration templates independently to perform custom replication processes and machine image generation processes (e.g., to cause replication data 130 to be generated for a server and stored at the cloud provider network every hour but only converting the replication data into a machine image 148 once a day, or other such processes).

In an embodiment, a console or other user interface 106 is configured with user interface elements or APIs that allow a user 110 to initiate and to configure other aspects of a server migration process, for example, to identify one or more VMs 114 to be migrated and, optionally, to identify a server migration template 120 describing a desired server migration workflow. In this manner, a user can use a console to initiate a server migration process by sending a server migration request 116 to a server migration service 118 (as shown at the circle labeled "1" in FIG. 1). For example, the user 110 may use an interface 106 to acquire a list of VMs 114 that have been "registered" with the server migration service 118 (e.g., via configuration data sent from migration proxy 124 to the server migration service 118 under the customer's account). The user 110 may then, for example, select one or more of these VMs 114 that are desired to be migrated and further provide input indicating a desire for the selected servers to be migrated, the input causing the electronic device 112 to send a server migration request 116 (e.g., an API call, a HyperText Markup Language (HTML) form submission, or other type of request) identifying which of the VMs 114 are to be migrated.

In some embodiments, the migration request 116 identifies a migration template 120. As described, the migration template 120 may be a template provided by the server migration service 118 or a custom template created by a user 110 or other user of the cloud provider network 100, where the template describes a server migration workflow along with custom configurations. In some embodiments, the server migration template includes global configurations and optionally additional configurations associated with one or more components of the server migration service 118. For example, the following is an example snippet from a server migration template defining various global configurations for a server migration workflow:

```
MigrationTemplateFormatVersion: "2010-09-09"
Description: VM Import/Export Workflow Model
Mappings:
   RegionMap:
      us-east-1:
         machine-image: 1234abc"
      us-west-1:
         machine-image: "def12304"
Parameters:
   EnvType:
      Description: Environment type.
      Default: test
      Type: String
      AllowedValues: [prod, dev, test]
      ConstraintDescription: must specify prod, dev, or test.
Conditions:
   CreateProdResources: !Equals [!Ref EnvType, prod]
   CreateDevResources: !Equals [!Ref EnvType, "dev"]
Resources:
   FullWorkflowModel:
      Type: CSP::HVS::MigrationModel
      Condition: CreateProdResources
      Properties:
         Validation: !Ref Validator1
         Convertion: !Ref Coverter1
         Injection: !Ref Injector1
         Booter:   !Ref Booter1
         Generator: !Ref Generator1
```

As shown, the example template includes various parameters and associated values in a structured format defining a name of the template, a template version, region identifiers at which to create machine images based on the migrated VM(s), as well as other environment variables and configurations related to the overall migration process including, e.g., an identification of the server migration components to be used in the workflow.

In some embodiments, at circle "2" in FIG. 1, the server migration service 118 sends a migration command 150 to a migration proxy 124 responsive to receiving a server migration request 116. In some embodiments, a polling mechanism is used wherein a migration proxy 124 periodically checks with the server migration service 118 (for example, via a RESTful API call to an API endpoint) to determine whether there are new migration requests for the migration proxy and, in response, the server migration service 118 can send any pending migration commands. In other embodiments, "push" messaging techniques such as Web push, HyperText Transfer Protocol (HTTP) server push, long polling, and so forth, can be used to notify a migration proxy 124 of a migration command 150. The migration command 150, in some embodiments, identifies one or more operations that the receiving migration proxy 124 is to perform and an identifier of a VM 114 that the migration proxy 124 is to perform the operations upon. In some embodiments, one or more of the operations can be specified based on instructions contained in a relevant migration template 120, e.g., to control how the replication data 130 is generated, a schedule for generating the replication data 130, or any other such configurations.

In some embodiments, a migration proxy 124 receiving a migration command 150 performs the instructed migration operations. The performance of the instructed operations can include sending commands to an associated VM management server 128 (for example, to cause it to perform certain operations relative to the VMs sought to be migrated) or possibly interacting directly with the VMs to perform the operations. A variety of different types of operations may be performed by a migration proxy 124 in response to the migration command 150 including, but not limited to, validating a received replication job; creating a base (or "full") snapshot of the identified VM's disk(s), memory, or both; creating a delta or "incremental" snapshot; optionally obtaining an encryption key from a key management service of the cloud provider network 100; encrypting data (for example, the created snapshots) using the obtained encryption key; creating a storage location (or "bucket") within the cloud provider network 100 (for example, using a storage virtualization service 132); uploading a base snapshot to the storage location; uploading a delta snapshot to the storage location; deleting artifacts that have already been uploaded; consolidating a snapshot, and so forth.

In other embodiments, instead of or in addition to creating and uploading discrete snapshots, a migration proxy 124 obtains a stream of data reflecting changes to a VM or physical server 114 and the streamed data can uploaded to the cloud provider network 100 (either each time a change is received or by batching the changes and periodically uploading the data). For example, an agent may be installed in the operating system (OS) of a physical server or an agent can interact with a hypervisor hosting a VM such that a filter driver streams information reflecting data written to a physical or virtual disk to the migration proxy 124.

In some embodiments, a migration proxy 124 requests a snapshot of a VM 114 identified in the migration command 150 from a VM management server 128 and receives the snapshot generated by the VM management server. As another example, an I/O filter driver agent can be installed in the OS of a physical server 114 and used to capture a snapshot of the server obtained by the migration proxy 124. In other embodiments, OS-level disk snapshots can be obtained (e.g., using a volume shadow copy service (VSS)) or a third-party storage array snapshot can be obtained.

In some embodiments, at circle "4," the migration proxy 124 sends, or "uploads," the replication data 130 to a storage virtualization service 132 and the migration proxy 124 also sends a message informing the server migration service 118 that the replication data 130 is stored in the storage virtualization service 132. For example, the migration proxy 124 can upload the replication data 130 to a bucket or folder created by the migration proxy 124 to store the data at the storage virtualization service 132 and, in return from the storage virtualization service 132, may receive a Uniform Resource Locator (URL) or other identifier of the location at which the data is stored. In some embodiments, the URL can be a "pre-signed" URL which grants time-limited permission to one or more other entities to access (for example, to download or copy) the data stored at the location identified by the pre-signed URL. In some embodiments, a migration proxy 124 sends the replication data 130 to the storage virtualization service 132 via an encrypted network connection, e.g., using the HTTPS protocol. In some embodiments, a schedule at which the migration proxy 124 generates the replication data and uploads the replication data 130 to a storage virtualization service 132 is determined based at least in part on scheduling information provided in a migration template 120 or migration template 122 associated with the originating migration request 116.

As indicated above, a server migration service 118 receives a message from a migration proxy 124 identifying the location at the storage virtualization service 132 at which the replication data 130 is stored. In some embodiments, the server migration service 118 forwards the request to an import/export service 134 (for example, via one or more API calls) and specifies the storage location of the replication data 130 at the storage virtualization service 132. Although shown as component of the server migration service 118 in FIG. 1, in various embodiments, the import/export service 134 can be a separate service or collection of services of the cloud provider network 100 or may be a partially or entirely integrated component of the server migration service 118. In general, the various components of an import/export service 134 may perform some or all of the operations involved in migrating a server at the cloud provider network 100 including, e.g., the generation of machine images 148 based on the replication data. As described in more detail herein, in some embodiments, the execution of the various components of the import/export service 134 is based at least in part on a migration template identified in the corresponding request.

In some embodiments, the generation of machine image 148 by an import/export service 134 can include one or more of: downloading the replication data 130 from the storage virtualization service 132 and validating the replication data (e.g., by a validation component 138), creating disk volume(s) (for example, at a storage service which may be part of or separate from storage virtualization service 132), converting the downloaded replication data into a format for storage in the created disk volume(s) (e.g., by a conversion component 140), storing the converted data in the volume(s), injecting drivers into the volume(s) (e.g., by an injection component 142), performing a test boot of a migrated VM contained in the volume(s) (e.g., by a test boot component 144), generating a snapshot of the migrated VM, generating a machine image of the migrated VM that can be used to create VM instances at the cloud provider network 100 (for example, using a separate hardware virtualization service 136), and storing the machine image, volume(s), and snapshot(s) at a storage location accessible to a customer account (e.g., by a snapshot creation component 146).

Figure 2:
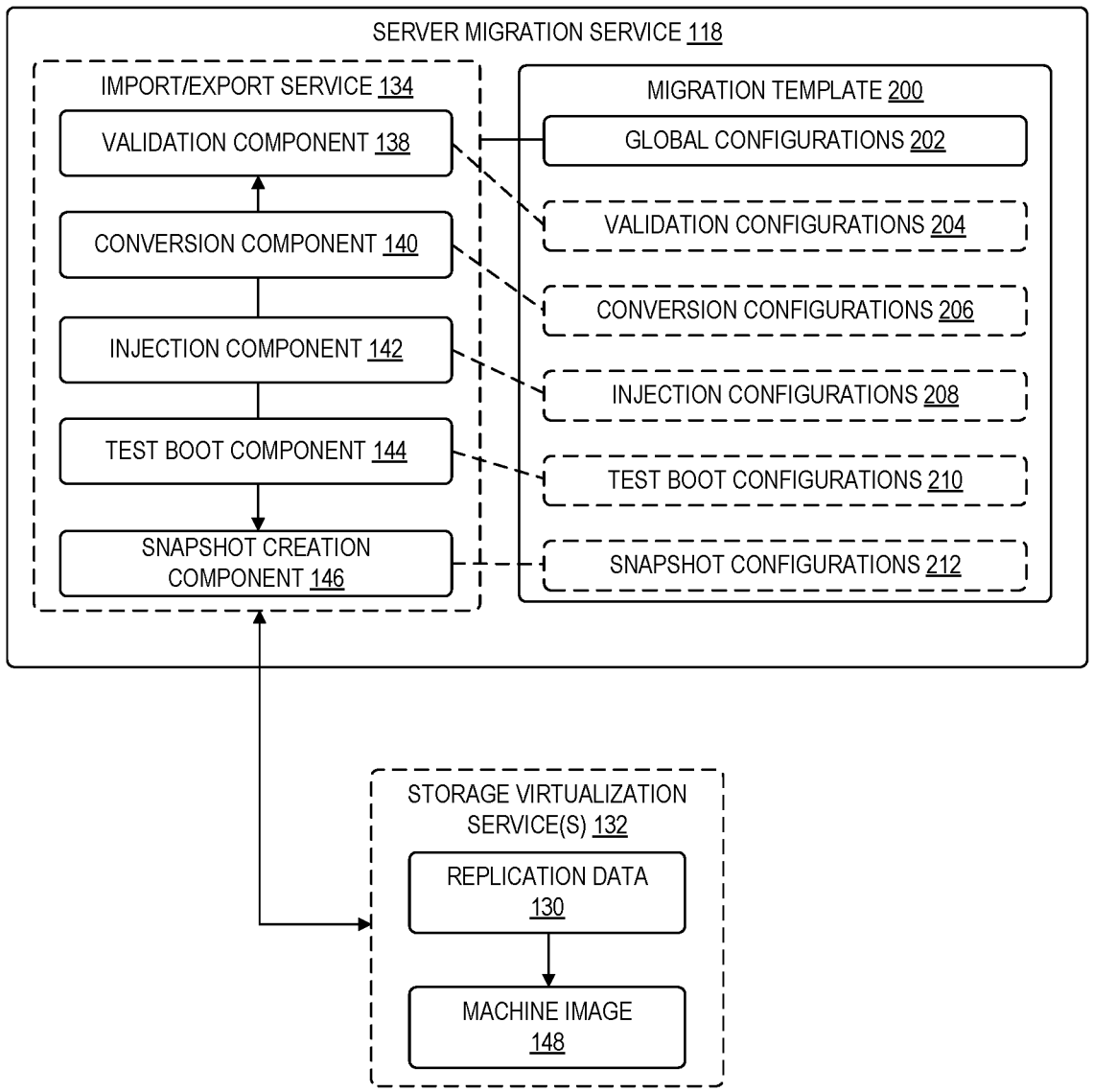
FIG. 2 is a diagram illustrating the use of a server migration template to customize the operation of a server migration service according to some embodiments.

FIG. 2 is a diagram illustrating the use of a server migration template to customize the operation of a server migration service according to some embodiments. As shown, a migration template 200, including global configurations 202 and optionally validation configurations 204, conversion configurations 206, injection configurations 208, test boot configurations 210, and snapshot configurations 212, is provided as an example template used to customize a migration workflow implemented by the components of the import/export service 134. As shown, each the separate types of configurations can be used to influence the operation of one or more components of the import/export service 134.

In some embodiments, the validation component 138 is used to validate a disk image located within a user's storage resource in the storage virtualization service 132. In some embodiments, an example snippet from a server migration template including validation service configurations is as follows:

```
Validator1:
    Type: CSP::HVS::MigrationValidation
    Properties:
        Size : true
        Format: true
```

As shown, the example validation configurations 204 define a type of validation to be performed and other properties (e.g., determining whether each of a size validation and a format validation is to be performed). In some embodiments, each of these properties can be optionally modified by a user, e.g., to skip the performance of certain validation checks or to add other validation checks.

In some embodiments, the conversion component 140 converts a disk image to a raw disk volume based on the provided disk image format, among other operations. The conversion component 140 can include configurations related to a source disk image format and a destination disk volume format. In some embodiments, associated conversion configurations 206 can also include configurations related to device identifiers, decompression methods, and the like. In some embodiments, an example snippet of a server migration template including conversion component configurations 206 is as follows:

```
Converter1:
    Type: CSP::HVS::MigrationConversion
    Properties:
        MBR: true
    Expansion:
        SourceFormat: "VMDK"
        DestinationFormat: "RAW"
```

In some embodiments, the injection component 142 analyzes a disk image's operating system and kernel and injects drivers used to execute the VM in a hardware virtualization service 136 (or other destination). In some embodiments, injection configurations 208 optionally define the types and versions of drivers to be injected, a location for the drivers to be injected, and the like. In some embodiments, a user can specify a custom storage location for device drivers to be used. The following is example snippet of injection configurations 208:

```
Injector1:
    Type: CSP::HVS::MigrationInjection
    Properties:
        Files:
            copyFiles [
                SRC: s://vmie-bucket/redhat/drivers/pw.ko
                DST: /lib/modules/pw.ko
            ];
        Configurations:
        [
            runscript: s://vmie-bucket/etc/init.d/myscript.sh
            runcmd: cp /etc/config /home/myconfig
        ]
```

As shown, the example injection configurations 208 specify a location of drivers or other data to be injected, a destination folder for the drivers or other data, an identifier of a custom script to be executed, and an identifier of a custom command to be executed to install the drivers or perform other operations.

In some embodiments, the test boot component 144 mounts a volume after injection as a root volume to a VM instance and tests if the instance can establish network connectivity (or any other test operations or combinations thereof). In some embodiments, the following is an example snippet illustrating test boot configurations 210:

```
Booter1:
    Type: "CSP::HVS::MigrationBooter"
    Properties:
        InstanceType: "m.xlarge"
        SecurityGroup: "booter-no-ports"
        VPC: "default-vpc"
        Booter VolumeType: "io1"
```

In some embodiments, the snapshot generation component 146 creates a snapshot from the volume and uses the snapshot to create a machine image 148 accessible to the user. In some embodiments, the following snippet of a migration template is an example of snapshot configurations 212:

```
Generator1:
    Type: CSP::HVS::MigrationGeneration
    Properties:
        StorageVolume: false
        StorageSnapshot: true
        machine-image: true
        StorageServiceExport : false
SnapshotModel:
    Type: CSP::HVS::MigrationModel
    Properties:
        Condition: CreateProdResources
    Properties:
        Convertion: !Ref Coverter2
        Generator: !Ref Generator2
Converter2:
    Type: CSP::HVS::MigrationConversion
    Properties:
        MBR: true
        Expansion:
            SourceFormat: "VMDK"
            DestinationFormat: "RAW"
Generator2:
    Type: CSP::HVS::MigrationGeneration
    Properties:
        Storage volume: false
        Storage snapshot: true
        Machine-image : false
        StorageServiceExport: false
MachineImageExportModel:
    Type: CSP::HVS::MigrationModel
    Properties:
        Condition: CreateProdResources
    Properties:
        Convertion: !Ref Coverter3
        Generator: !Ref Generator3
Converter3:
    Type: CSP::HVS::MigrationConversion
    Properties:
        MBR: false
        Expansion:
            SourceFormat: "RAW"
            DestinationFormat: "VMDK"
Generator3:
    Type: CSP::HVS::MigrationGeneration
    Properties:
        StorageServiceVolume: false
        StorageServiceSnapshot: false
        Machine-image: false
        StorageServiceExport: true
```

Figure 3:
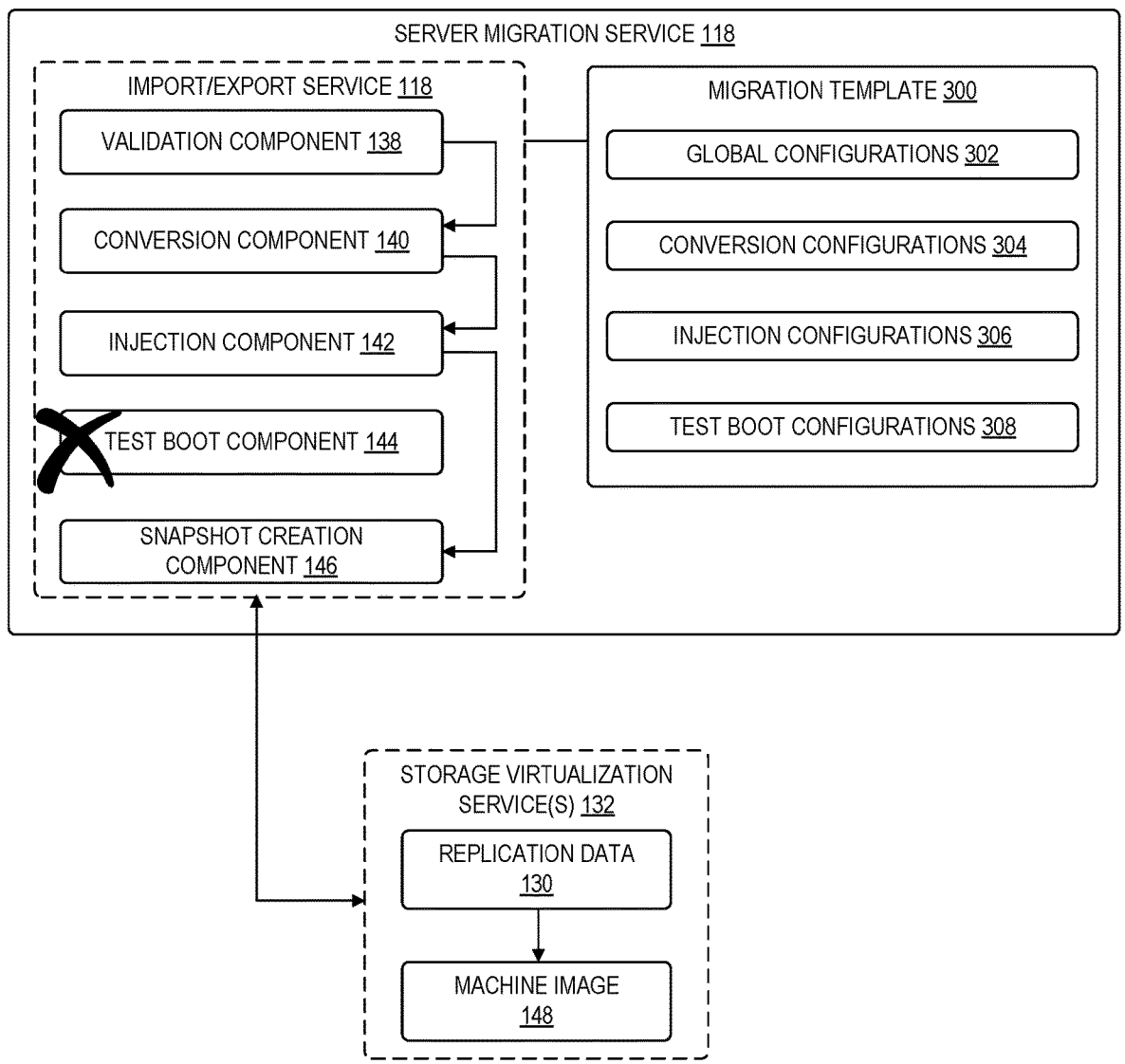
FIG. 3 is a diagram illustrating the selective use of server migration services based on a server migration template according to some embodiments.

FIG. 3 illustrates an example of the selective use of import/export service 134 components based on a server migration template 300. In this example, the server migration template 300 includes global configurations 302, conversion configurations 304, injection configurations 306, and test boot configurations 308. In this example, validation configurations and snapshot generation configurations may be omitted such that default validation and snapshot generation operations are performed by the import/export service 134. Furthermore, in this example, the migration template 300 is used to alter the set of operations performed, e.g., to skip the use of the test boot component 144. For example, a user may not desire for the user's migration process for particular servers to incur the time associated with performing a test boot and thus may cause the test boot component to be disabled during the associated migration workflow. In this example, responsive to the identified migration template 300, the import/export service 134 performs the requested migration in part by bypassing test boot operations normally performed by the test boot component 144. In other examples, other migration workflows may be designed, e.g., to only generate replication data and validate the replication data without generating a resulting snapshot, or a workflow that only generates a new snapshot from existing replication data, and the like.

Figure 4:
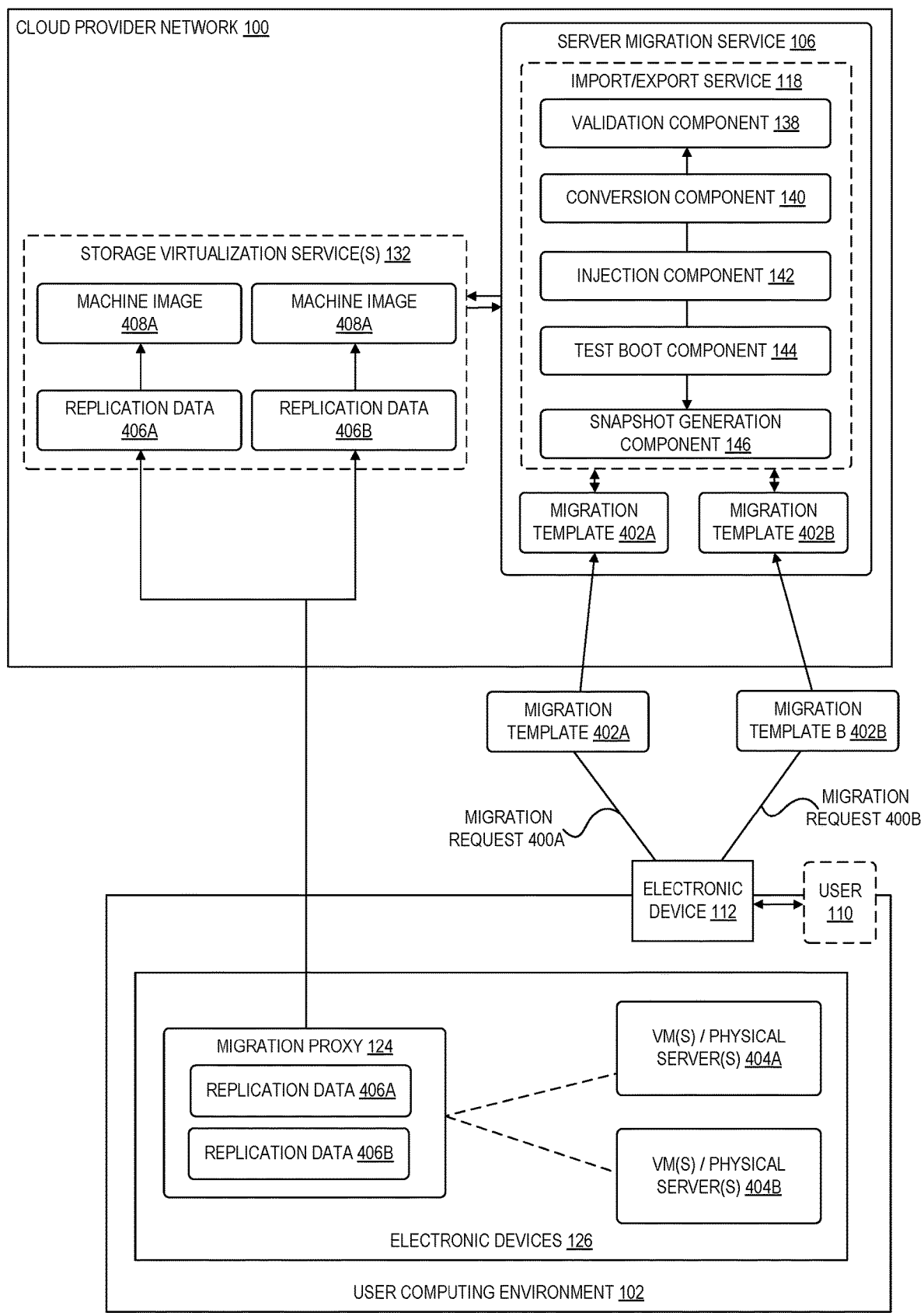
FIG. 4 is a diagram illustrating the application of different server migration templates to different servers within a user's on-premises computing environment according to some embodiments.

FIG. 4 is a diagram illustrating the application of different server migration templates for different servers within a user's on-premises computing environment according to some embodiments. As shown in FIG. 4, at various times, a user 110 generates a migration request 400A identifying a migration template 402A and separately generates a migration request 400B identifying a migration template 402B. In this example, the migration template 402A is used to migrate servers 404A, while the migration template 402B is used to migrate servers 404B. For example, servers 404A might be a first type of server that is different from servers 404B (e.g., Windows® or Linux® servers, respectively), or servers 404A and 404B might be associated with different server groups (e.g., a production group and a testing group). In general, the respective migration templates 402A and 402B can implement different replication schedules, machine image generation schedules, different configurations of the import/export service 134 components, and the like, depending on the user's particular use case.

In some embodiments, based on the different migration templates 402A and 404B, the migration proxy 124 in FIG. 4 generates separate replication data 406A and 408B, respectively. As indicated above, the replication data 406A and 406B potentially can be generated based on different schedules and with different configurations depending on the settings specified in the respective migration templates 402A and 402B. Similarly, in some embodiments, the import/export service 134 generates separate machine images 408A and 408B for the respective servers according to the configurations specified in the respective migration templates 402A and 404B. In some embodiments, the migration templates 402A and 402B can specify entirely different migration workflows comprised of different components from the plurality of migration components defined by the import/export service 134.

In some embodiments, a server migration template can also be used to specify one or more parameters associated with launching VMs or other types of computing resources based on a generated machine image. For example, the launch parameters can include the specification of a security group into which VM instances are to be launched, hardware specifications associated with launched VM instances (e.g., in terms of processing, memory, and networking resources), and the like. In some embodiments, a migration template can indicate that one or more VMs are to be launched automatically once migration processes are complete (e.g., by launching a VM based on a machine image 148 using a hardware virtualization service 136).

Figure 5:
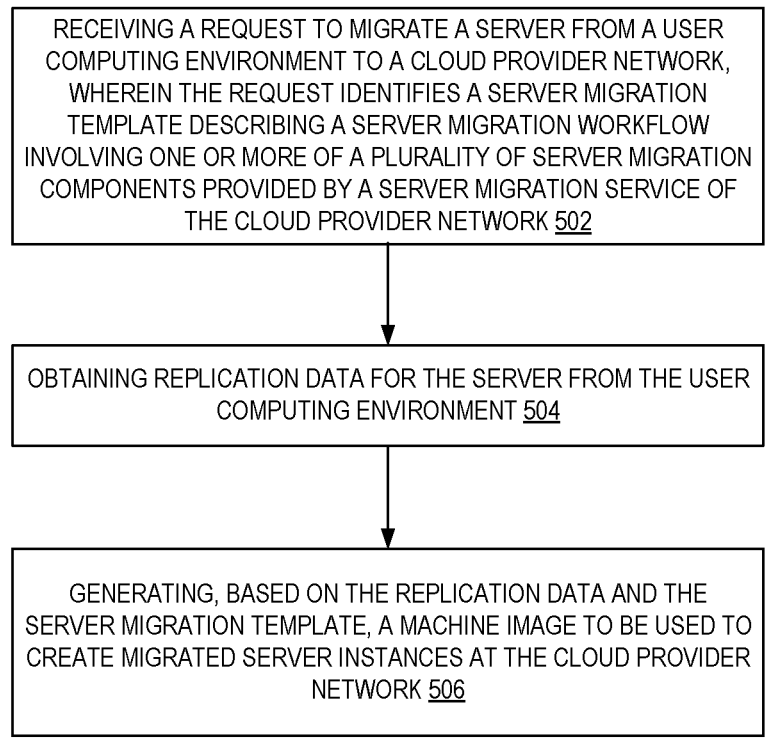
FIG. 5 is a flow diagram illustrating operations of a method for enabling model-driven server migration workflows in a cloud provider network according to some embodiments.

FIG. 5 is a flow diagram illustrating operations 500 of a method for enabling model-driven server migration workflows in a cloud provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a server migration service 118 of the other figures.

The operations 500 include, at block 502, receiving a request to migrate a server from a user computing environment to a cloud provider network, wherein the request identifies a server migration template describing a server migration workflow involving one or more of a plurality of server migration components provided by a server migration service of the cloud provider network.

In some embodiments, each of the plurality of server migration components provided by the server migration service is configurable by a user of the cloud provider network, and wherein the plurality of server migration components includes two or more of: a validation component used to perform a validation check on the replication data, a conversion component used to convert the replication data to a raw disk volume, an injection component used to inject drivers into the raw disk volume, a test booting component used to test a mounted volume, a snapshot generation component used to create the machine image, or a continuous replication component used to replicate delta snapshots onto a base snapshot.

The operations 500 further include, at block 504, obtaining replication data for the server from the user computing environment.

The operations 500 further include, at block 506, generating, based on the replication data and the server migration template, a machine image to be used to create migrated server instances at the cloud provider network.

In some embodiments, the server migration workflow enables a first server migration component of the plurality of server migration components and disables a second server migration component of the plurality of server migration components, and wherein the operations further include generating the machine image in part by executing the first server migration component and bypassing execution of the second server migration component.

In some embodiments, the server migration template specifies a launch parameter associated with the machine image, and wherein the operations further include launching a virtual machine (VM) based on the machine image and the launch parameter.

In some embodiments, the server migration template identifies a user-generated script to be executed by a server migration service during the server migration workflow, and wherein the operations further include executing the script during the server migration workflow.

In some embodiments, the server migration template specifies a kernel version and a distribution version associated with the server, and wherein the operations further include injecting, by an injection component of the plurality of server migration components, a set of drivers into a disk volume based on the kernel version and the distribution version specified in the server migration template.

In some embodiments, the server migration template specifies a storage location storing a set of drivers, and wherein the operations further include: obtaining the set of drivers from the storage location; and injecting, by an injection component of the plurality of server migration components, the set of drivers into a disk volume created based on the replication data.

In some embodiments, the server migration template is a first server migration template associated with a first server of the user computing environment and a first server migration workflow, and the operations further include: receiving a request to migrate a second server from the user computing environment to the cloud provider network, wherein the request identifies a second server migration template describing a second server migration workflow that is different from the first server migration workflow; obtaining second replication data for the second server from the user computing environment; and generating, based on the second replication data and the second server migration template, a second server image to be used to create migrated server instances at the cloud provider network.

In some embodiments, the server migration service is implemented using a microservice architecture, and wherein each server migration component of the plurality of server migration components is implemented by one or more microservices of the microservice architecture.

In some embodiments, the operations further include generating the machine image by performing at least one of: creating a disk volume, converting the replication data to a format for storage in the disk volume to obtain a migrated server, storing the migrated server in the disk volume, injecting drivers into the disk volume, performing a test boot of the migrated server in the disk volume, creating a snapshot of the migrated server based on the snapshot, or storing the machine image at a storage location accessible to a user account of the cloud provider network.

In some embodiments, the operations further include sending a request to a migration proxy located within the user computing environment, wherein the request causes the migration proxy to: generate replication data for the server, wherein the replication data includes at least one of: a disk snapshot, a memory snapshot, or a machine image; and send the replication data to a storage location at the cloud provider network.

Figure 6:
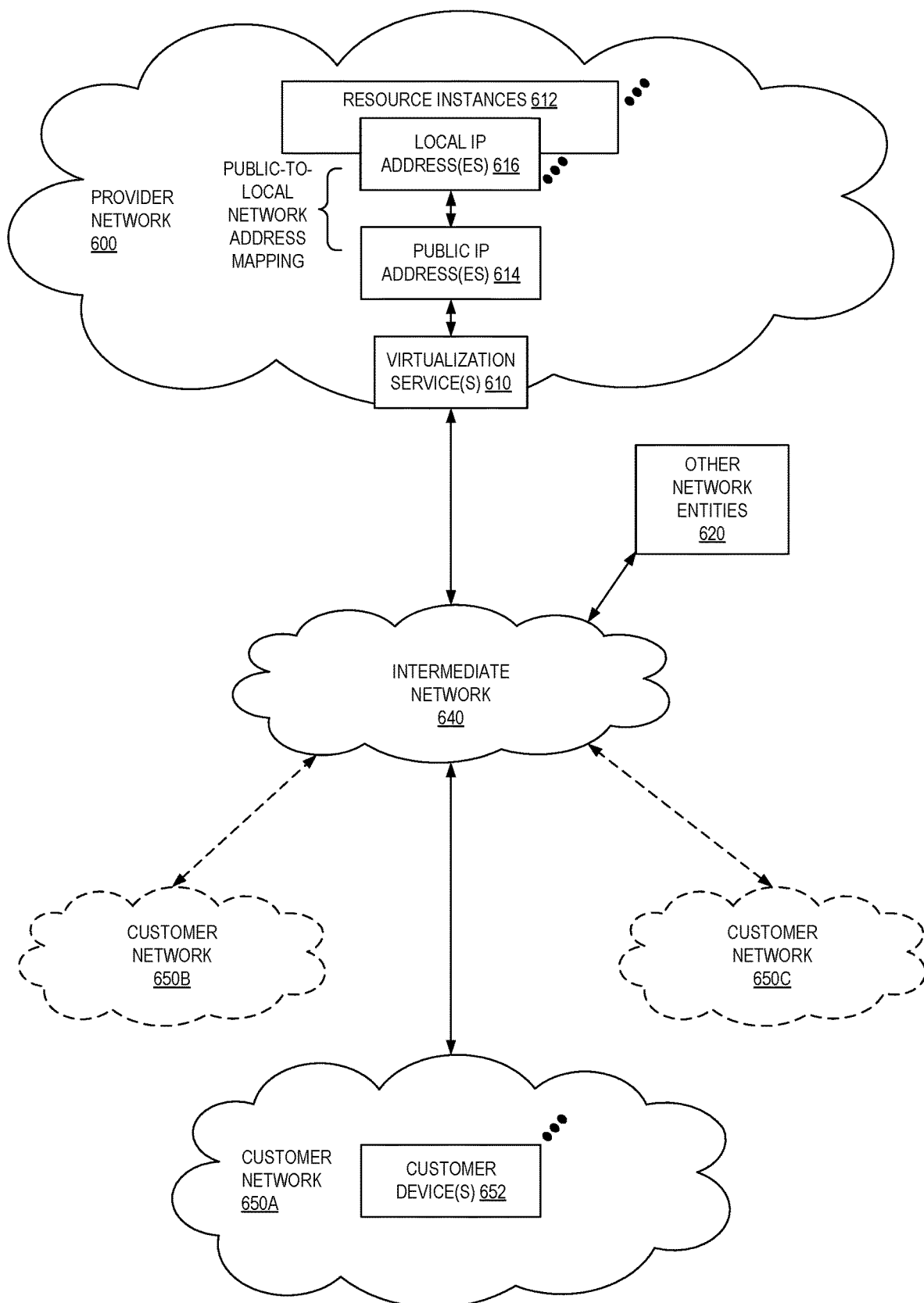
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
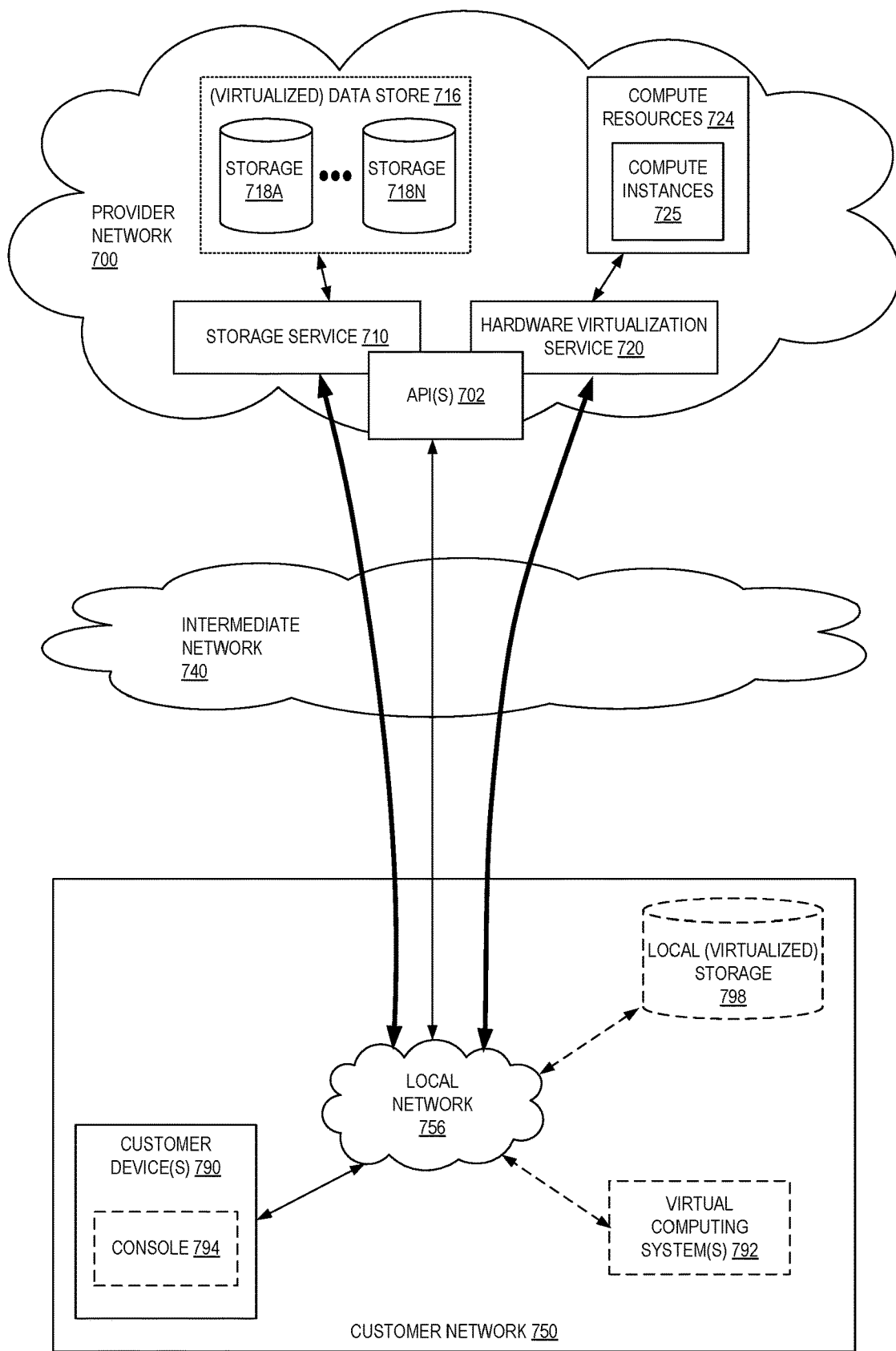
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
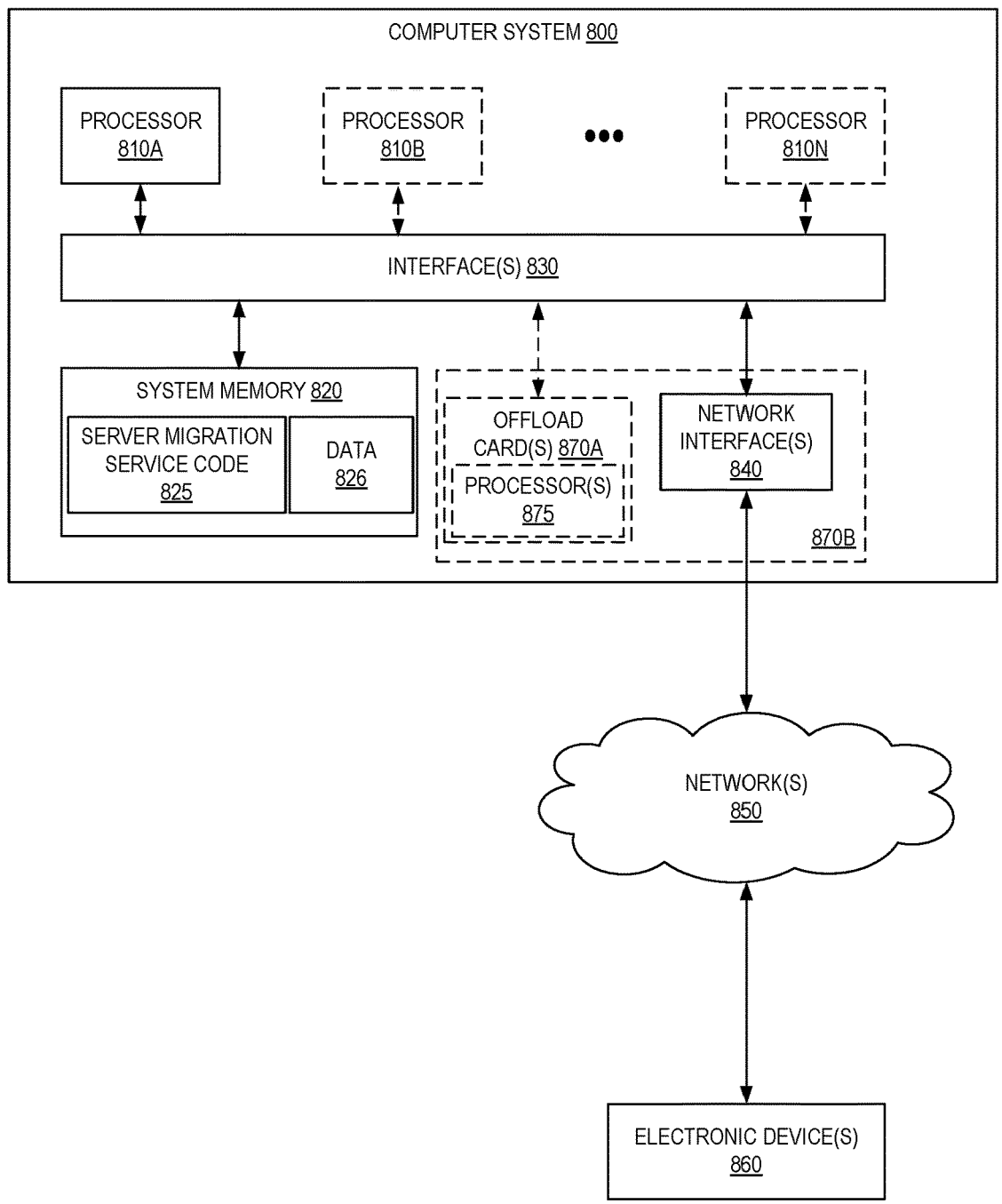
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as server migration service code 825 (e.g., executable to implement, in whole or in part, the server migration service 118) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s)

can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving input of a selection of a virtual machine (VM) of a plurality of listed VMs from a user computing environment for migration, wherein the plurality of listed VMs are registered with a server migration service located within a cloud provider network;
   receiving, by the server migration service, a request to migrate the VM from the user computing environment to the cloud provider network, wherein the request identifies the VM and a server migration template describing a server migration workflow, wherein the server migration workflow involves one or more of a plurality of server migration components provided by the server migration service, and wherein the server migration template includes a user-specified configuration related to a server migration component of the plurality of server migration components;
   in response to receiving the request, sending, by the server migration service to a migration proxy located within the user computing environment, a migration command;
   in response to receiving the migration command the migration proxy:
      generating replication data for the VM, and
      sending the replication data to a storage location at the cloud provider network;
   after the replication data is stored at the storage location, obtaining, by the server migration service, the replication data for the VM from the storage location at the cloud provider network accessible to a user account; and
   generating, based on the replication data and the server migration template, a machine image to be used to create migrated VM instances at the cloud provider network.

2. The computer-implemented method of claim 1, wherein each of the plurality of server migration components provided by the server migration service is configurable by a user of the cloud provider network, and wherein the plurality of server migration components includes two or more of:
   a validation component used to perform a validation check on the replication data,
   a conversion component used to convert the replication data to a raw disk volume,
   an injection component used to inject drivers into the raw disk volume,
   a test booting component used to test a mounted volume,
   a snapshot generation component used to create the machine image, or
   a continuous replication component used to replicate delta snapshots onto a base snapshot.

3. The computer-implemented method of claim 1, wherein the server migration workflow enables a first server migration component of the plurality of server migration components and disables a second server migration component of the plurality of server migration components, and wherein the method further comprises generating the machine image in part by executing the first server migration component and bypassing execution of the second server migration component.

4. A computer-implemented method comprising:
   receiving input of a selection of a virtual machine (VM) of a plurality of listed VMs from a user computing environment for migration, wherein the plurality of listed VMs are registered with a server migration service located within a cloud provider network;
   receiving, by the server migration service, a request to migrate the VM from the user computing environment to the cloud provider network, wherein the request identifies the VM and a server migration template describing a server migration workflow involving one or more of a plurality of server migration components provided by the server migration service located within the cloud provider network;
   in response to receiving the request, sending, by the server migration service to a migration proxy located within the user computing environment, a migration command;
   in response to receiving the migration command, the migration proxy:
      generating replication data for the VM; and
      sending the replication data to a storage location at the cloud provider network;
   after the replication data is stored at the storage location, obtaining, by the server migration service, the replication data for the VM from the storage location at the cloud provider network; and
   generating, based on the replication data and the server migration template, a machine image to be used to create migrated VM instances at the cloud provider network.

5. The computer-implemented method of claim 4, wherein each of the plurality of server migration components provided by the server migration service is configurable by a user of the cloud provider network, and wherein the plurality of server migration components includes two or more of:
   a validation component used to perform a validation check on the replication data,
   a conversion component used to convert the replication data to a raw disk volume,
   an injection component used to inject drivers into the raw disk volume,
   a test booting component used to test a mounted volume,
   a snapshot generation component used to create the machine image, or
   a continuous replication component used to replicate delta snapshots onto a base snapshot.

6. The computer-implemented method of claim 4, wherein the server migration workflow enables a first server migration component of the plurality of server migration components and disables a second server migration component of the plurality of server migration components, and wherein the method further comprises generating the machine image in part by executing the first server migration component and bypassing execution of the second server migration component.

7. The computer-implemented method of claim 4, wherein the server migration template specifies a launch parameter associated with the machine image, and wherein the method further comprises launching a virtual machine (VM) based on the machine image and the launch parameter.

8. The computer-implemented method of claim 4, wherein the server migration template identifies a user-generated script to be executed by the server migration service during the server migration workflow, and wherein the method further comprises executing the script during the server migration workflow.

9. The computer-implemented method of claim 4, wherein the server migration template specifies a kernel version and a distribution version associated with the server VM, and wherein the method further comprises injecting, by an injection component of the plurality of server migration components, a set of drivers into a disk volume based on the kernel version and the distribution version specified in the server migration template.

10. The computer-implemented method of claim 4, wherein the server migration template specifies a storage location storing a set of drivers, and wherein the method further comprises:
  obtaining the set of drivers from the storage location storing the set of drivers; and
  injecting, by an injection component of the plurality of server migration components, the set of drivers into a disk volume created based on the replication data.

11. The computer-implemented method of claim 4, wherein the server migration template is a first server migration template associated with a first VM of the user computing environment and a first server migration workflow, and wherein the method further comprises:
  receiving a request to migrate a second VM from the user computing environment to the cloud provider network, wherein the request identifies a second server migration template describing a second server migration workflow that is different from the first server migration workflow;
  obtaining second replication data for the second VM from the user computing environment; and
  generating, based on the second replication data and the second server migration template, a second machine image to be used to create migrated VM instances at the cloud provider network.

12. The computer-implemented method of claim 4, wherein the server migration service is implemented using a microservice architecture, and wherein each server migration component of the plurality of server migration components is implemented by one or more microservices of the microservice architecture.

13. The computer-implemented method of claim 4, further comprising generating the machine image by performing at least one of:
  creating a disk volume,
  converting the replication data to a format for storage in the disk volume to obtain a migrated VM,
  storing the migrated VM in the disk volume,
  injecting drivers into the disk volume,
  performing a test boot of the migrated VM in the disk volume,
  creating a snapshot of the migrated VM based on the snapshot, or
  storing the machine image at a storage location accessible to a user account of the cloud provider network.

14. A system comprising:
  a first one or more electronic devices to implement a server migration service located within a multi-tenant cloud provider network, the server migration service including instructions that upon execution by one or more processors of the server migration service cause the server migration service to:
    receive input of a selection of a virtual machine (VM) of a plurality of listed VMs from a user computing environment for migration, wherein the plurality of listed VMs are registered with the server migration service,
    receive a request to migrate the VM from the user computing environment to the multi-tenant cloud provider network, wherein the request identifies the VM and a server migration template describing a server migration workflow, wherein the server migration workflow involves one or more of a plurality of server migration components provided by the server migration service, and wherein the server migration template includes a user-specified configuration related to a server migration component of the plurality of server migration components,
    in response to receiving the request, send a migration command to a migration proxy located within the user computing environment to obtain replication data for the VM from a storage location at the multi-tenant cloud provider network,
    after the replication data is stored at the storage location, obtain the replication data for the VM from the storage location at the multi-tenant cloud provider network, and
    generate, based on the replication data and the server migration template, a machine image to be used to create migrated VM instances at the multi-tenant cloud provider network; and
  a second one or more electronic devices to implement the migration proxy located within the user computing environment, the migration proxy including instructions that upon execution by one or more processors of the migration proxy cause the migration proxy to, in response to receiving the migration command:
    generate the replication data for the VM, and
    send the replication data to the storage location at the multi-tenant cloud provider network.

15. The system of claim 14, wherein each of the plurality of server migration components provided by the server migration service is configurable by a user of the cloud provider network, and wherein the plurality of server migration components includes two or more of:
  a validation component used to perform a validation check on the replication data,
  a conversion component used to convert the replication data to a raw disk volume,
  an injection component used to inject drivers into the raw disk volume,
  a test booting component used to test a mounted volume,
  a snapshot generation component used to create the machine image, or
  a continuous replication component used to replicate delta snapshots onto a base snapshot.

16. The system of claim 14, wherein the server migration workflow enables a first server migration component of the plurality of server migration components and disables a second server migration component of the plurality of server migration components, and wherein the server migration service further includes instructions that upon execution by the one or more processors of the server migration service cause the server migration service to generate the machine image in part by executing the first server migration component and bypassing execution of the second server migration component.

17. The system of claim 14, wherein the server migration template specifies a launch parameter associated with the server image, and wherein the server migration service further includes instructions that upon execution by the one or more processors of the server migration service cause the server migration service to launch a virtual machine (VM) based on the server image and the launch parameter.

18. The system of claim 14, wherein the server migration template identifies a user-generated script to be executed by the server migration service during the server migration workflow, and wherein the server migration service further includes instructions that upon execution by the one or more processors of the server migration service cause the server migration service to execute the script during the server migration workflow.

19. The system of claim 14, wherein the server migration template specifies a kernel version and a distribution version associated with the server, and wherein the server migration service further includes instructions that upon execution by the one or more processors of the server migration service cause the server migration service to inject, by an injection component of the plurality of server migration components, a set of drivers into a disk volume based on the kernel version and the distribution version specified in the server migration template.

20. The system of claim 14, wherein the server migration template specifies a storage location storing a set of drivers, and wherein the server migration service further includes instructions that upon execution by the one or more processors of the server migration service cause the server migration service to:
   obtain the set of drivers from the storage location storing the set of drivers; and
   inject, by an injection component of the plurality of server migration components, the set of drivers into a disk volume created based on the replication data.

* * * * *